Patented Feb. 9, 1932

1,844,824

UNITED STATES PATENT OFFICE

FRITZ SEEBACH, OF ERKNER-BERLIN, GERMANY, ASSIGNOR TO BAKELITE GESELL-SCHAFT MIT BESCHRANKTER HAFTUNG, OF BERLIN-CHARLOTTENBURG, GERMANY

PROCESS OF PRODUCING OIL SOLUBLE PHENOL ALDEHYDE CONDENSATION PRODUCTS

No Drawing. Application filed December 27, 1927, Serial No. 242,970, and in Germany January 3, 1927.

In my previous application Ser. No. 239,008, filed December 9, 1927, Patent 1,809,732 issued June 9, 1931, I have described a process of producing oil soluble phenol aldehyde condensation products. According to this process phenol aldehyde condensation products are caused to react in the heat with phenols containing more than one benzene ring, or phenols containing more than one hydroxyl and one or more benzene rings. The condensation products so obtained may be dissolved with oil by boiling, but they also form colloidal solutions by cold mixing with fatty oils or varnishes.

The present process of producing oil soluble condensation products and solutions of same in fatty oils facilitates the formation of colloidal solutions of the condensation products in fatty oils and varnishes or increases the dispersity of the resins in such solutions. The process consists in combining phenol aldehyde condensation products with phenols containing more than one benzene ring or with phenols with more than one hydroxyl and one or more benzene rings and with natural resins. I add for instance natural resins to the condensation products produced according to my application Ser. No. 239,008, filed December 9, 1927, and I dissolve the condensation products, obtained according to my application Ser. No. 239,008, filed December 9, 1927, in fatty oils and varnishes in presence of natural resins. Suitable natural resins are for instance colophony (rosin), dammar-resin, dragon's-blood, copal, mastic, shellac, grass-tree gum (acaroid). The advantageous action of natural resins on the formation of colloidal solutions of the condensation products in fatty oils and varnishes is unexpected and surprising. The chemical combination of natural resins with the condensation products evidently does not take place. It seems as if the natural resins in the dissolving of the condensation products, obtained according to my application Ser. No. 239,008, filed December 9, 1927, in fatty oils or varnishes act as protective colloids.

The process may also be carried out by adding the natural resins to the raw materials of the oil soluble condensation products obtainable according to my application Ser. No. 239,008, filed December 9, 1927, during the manufacturing of such condensation products either in the beginning or in the course of the reaction, the natural resins evidently acting as diluting agent, thereby moderating the reaction. From the condensation products so obtained solutions in fatty oils and varnishes may easily be produced.

The production of condensation products according to the present process may be carried out according to the methods described in my application Ser. No. 239,008, filed December 9, 1927, either under application of catalyzing agents as hydrated oxide of manganese, lead oxide or without catalytic agents. Furthermore, the phenols containing more than one benzene ring or phenols with more than one hydroxyl containing one or more benzene rings may be combined with phenol-aldehyde condensation products which are capable of hardening or not capable of hardening.

*Example 1*

100 kilos of a phenol aldehyde condensation product,
40 kilos of β-naphthol,
0.5 kilo of hydrated oxide of manganese, are molten at 140–150° C. for 10 minutes and, the main reaction being completed, molten with 50–60 kilos of colophony at the same temperature.

*Example 2*

100 kilos of a phenol aldehyde condensation product,
40 kilos of β-naphthol,
60 kilos of colophony,
0.5 kilo of hydrated oxide of manganese are molten at 150° C. and the temperature is maintained for 30–60 minutes.

In the case of both examples the catalytic agent (hydrated oxide of manganese) may be left out. β-naphthol may be replaced by α-naphthol, diphenols, xanthen, dioxidibenzyl, dicresols and their homologues or resorcin.

Instead of colophony the same quantities of dammar-resin, dragon's-blood, copal, mastic, shellac, grass-tree gum (acaroid) or their mixtures may be used.

Example 3

The condensation products are produced according to my application Ser. No. 239,008, filed December 9, 1927, for instance 100 kilos of condensation products capable of hardening are heated with 40 kilos of β-naphthol and, the main reaction being completed, the temperature is maintained at 260° C. for 1½ hours.

Thereupon after cooling the mass 60 kilos of pulverized natural resin are added and the whole well mixed and cooled.

Example 4

120 kilos of phenol formaldehyde resin, capable of hardening, 120 kilos of phenol formaldehyde resin (Novolak) not capable of hardening, 50 kilos of β-naphthol, ½ kilo of hydrated oxide of manganese are heated and, the main reaction being completed, the temperature is maintained for 10–15 minutes at 140° C., and the mass discharged into a receptacle. After cooling the resin is pulverized and then mixed with 50–60 kilos of the above mentioned natural resins.

Example 5

The mixing of the condensation product with the natural resin may also be effected by dissolving the natural resin in alcohol or in some other solvent and thereupon mixing the solution with the condensation product as obtained in accordance with my application Ser. No. 239,008, filed December 9, 1927, the admixture taking place by grinding in a mixing machine. This mixture may be added to fatty oils and varnishes or the solvent may be evaporated and the residue dissolved in oil or varnish.

Example 6

60 kilos of fusible phenolaldehyde condensation product capable of hardening,
20 kilos of resorcin,
40 kilos of colophony,
are molten at 130–170° C. for 10–20 minutes. After eliminating the aqueous vapours a hard oil soluble resin is obtained.

The process may also be carried out by dissolving the natural resin in a fatty oil or in a varnish and thereupon mixing or grinding it with the condensation product obtained in accordance with my application Ser. No. 239,008, filed December 9, 1927.

The mixing of the condensation product obtained by adding natural resin or the mixing of the mixture of condensation product and natural resin in oil or varnish, as for instance linseed-oil, linseed-oil-varnish, poppy-seed-oil, wood-oil, castor oil, soya-bean-oil, may be effected in the usual way, for instance by boiling or mixing. Diluting agents as turpentine spirits, benzene, alcohol, acetone, carbon tetra-chloride, camphor oil or the like may also be used for producing the solutions.

What I claim is:

1. A process for the production of fatty oil-soluble phenol-aldehyde condensation products comprising combining fusible phenol-aldehyde condensation products with phenols containing more than one benzene ring in presence of natural resins.

2. A process for the production of fatty oil-soluble phenol-aldehyde condensation products comprising combining fusible phenol-aldehyde condensation products with phenols containing more than one hydroxyl and one or more benzene rings in presence of natural resins.

3. A process for the production of fatty oil-soluble phenol-aldehyde condensation products comprising combining fusible phenol-aldehyde condensation products with phenols containing more than one benzene ring in presence of catalytic agents and natural resins.

4. A process for the production of fatty oil-soluble phenol-aldehyde condensation products comprising combining fusible phenol-aldehyde condensation products with phenols containing more than one hydroxyl and one or more benzene rings in presence of catalytic agents and natural resins.

5. A process for the production of fatty oil-soluble phenol-aldehyde condensation products comprising heating fusible phenol-aldehyde condensation products in presence of catalytic agents with phenols containing more than one benzene ring, and then adding natural resins.

6. A process for the production of fatty oil-soluble phenol-aldehyde condensation products comprising heating fusible phenol-aldehyde condensation products in presence of catalytic agents with phenols containing more than one hydroxyl and one or more benzene rings, and then adding natural resins.

7. The process of producing fatty oil-solutions of phenol-aldehyde condensation products comprising mixing condensation products obtained by heating fusible phenol-aldehyde resins with phenols containing more than one benzene ring, with natural resins, and stirring the mixture with fatty oils.

8. The process of producing fatty oil-solutions of phenol-aldehyde condensation products comprising mixing condensation products obtained by heating fusible phenol-aldehyde resins with phenols containing more than one benzene ring, with natural resins and with solvents of such resins, and then stirring the mixture with fatty oils.

9. The process of producing fatty oil-solutions of phenol-aldehyde condensation products comprising mixing condensation products obtained by heating fusible phenol-aldehyde resins with phenols containing more than one hydroxyl and one or more benzene rings, with natural resins, and then grinding the mixture with fatty oils.

10. The process of producing fatty oil-solutions of phenol-aldehyde condensation products comprising mixing condensation products obtained by heating fusible phenol-aldehyde resins with phenols containing more than one hydroxyl and one or more benzene rings, with natural resins and with solvents of such resins, and then grinding the mixture with fatty oils.

11. The process of producing fatty oil-solutions of phenol-aldehyde condensation products comprising mixing condensation products obtained by heating fusible phenol-aldehyde resins with phenols containing more than one benzene ring, with fatty oils containing natural resins in solution.

12. The process of producing fatty oil-solutions of phenol-aldehyde condensation products comprising mixing condensation products obtained by heating fusible phenol-aldehyde resins with phenols containing more than one hydroxyl and one or more benzene rings, with fatty oils containing natural resins in solution.

13. A composition of matter comprising the oil-soluble reaction product of a fusible phenol-aldehyde condensation product and a phenol containing more than one benzene ring and a natural resin.

14. A composition of matter comprising the oil-soluble reaction product of a fusible phenol-aldehyde condensation product and a phenol containing more than one hydroxyl and one or more benzene rings and a natural resin.

15. A composition of matter comprising the oil-soluble reaction product obtainable by heating a fusible phenol-aldehyde condensation product with a phenol containing more than one benzene ring in the presence of a natural resin.

16. A composition of matter comprising the oil-soluble reaction product obtainable by heating a fusible phenol-aldehyde condensation product with a phenol containing more than one hydroxyl and one or more benzene rings in the presence of a natural resin.

17. A composition of matter comprising the oil-soluble reaction product of a fusible phenol-aldehyde condensation product, a phenol containing more than one benzene ring, a natural resin and a fatty oil.

18. A composition of matter comprising the oil-soluble reaction product of a fusible phenol-aldehyde condensation product and a naphthol and a natural resin.

In testimony whereof I affix my signature.
FRITZ SEEBACH.